United States Patent Office 3,422,431
Patented Jan. 14, 1969

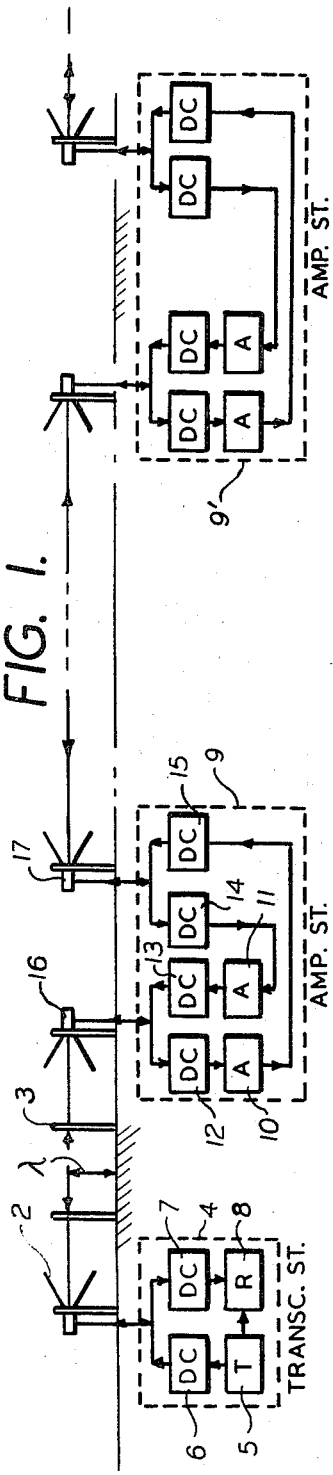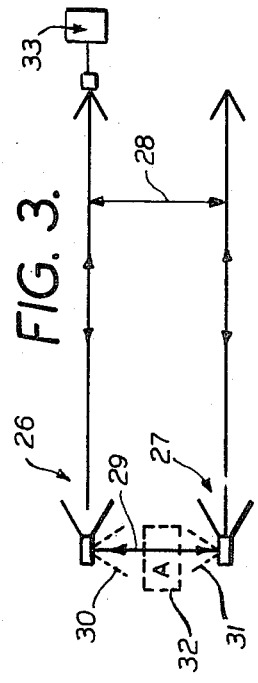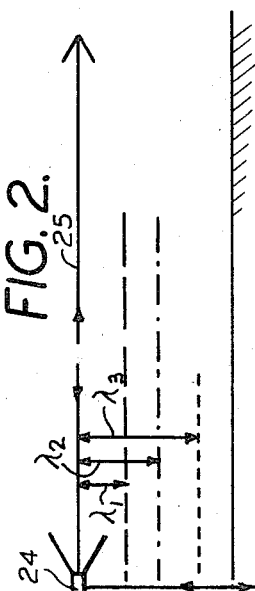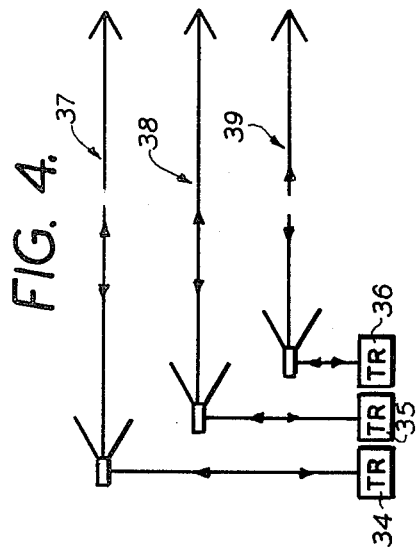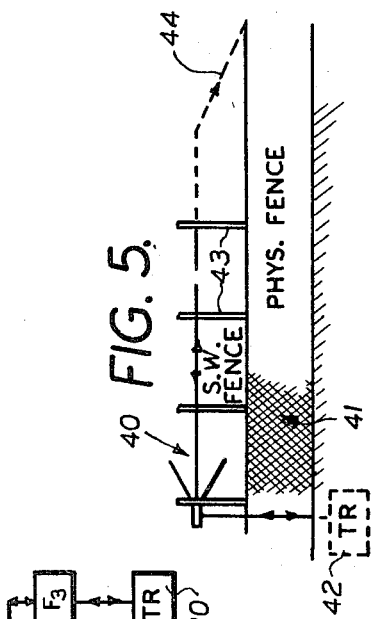
INVENTOR
THEODORE HAFNER

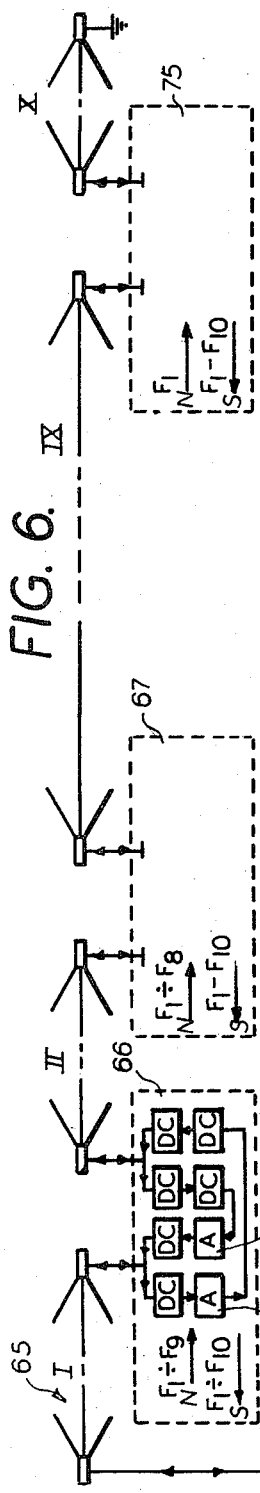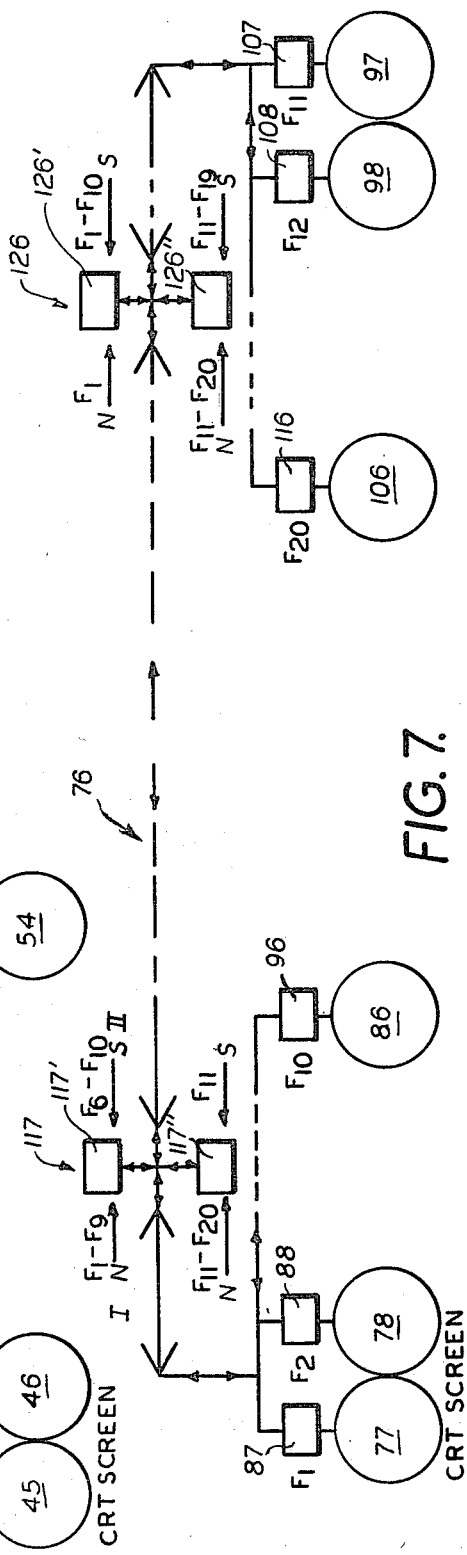
FIG. 6.
FIG. 7.
INVENTOR
THEODORE HAFNER

3,422,431
**DETECTION OF OBJECTS IN AN ELECTRO-
MAGNETIC FIELD**
Theodore Hafner, 1501 Broadway,
New York, N.Y. 10036
Continuation-in-part of application Ser. No. 587,611,
Oct. 18, 1966. This application Mar. 14, 1967, Ser.
No. 623,100
U.S. Cl. 343—13                  11 Claims
Int. Cl. G01s 9/06; G08b 13/00; G08b 13/24

ABSTRACT OF THE DISCLOSURE

The invention consists in substance of combining a single surface wave transmission line carrying surface waves of a field diameter of the order of one wavelength and supported at a distance above ground of the order of such wavelength to determine a surface wave propagation path between line and ground, with means for transmitting pulses of a frequency within the operating range of the line and through said propagation path, to indicate the position in time of the transmitted pulses as well as those reflected from an object in the propagation path and received over the line, so as to determine the difference in travel time between transmitted and reflected pulses, and thereby the distance of the object from the point of transmission.

---

This invention relates to a method and a system for the detection of objects in an electromagnetic field, and more specifically in a terrestrial field.

This is a continuation-in-part of Ser. No. 587,611, filed Oct. 18, 1966.

One of the objects of the invention is to provide a surface wave transmission line for producing a predeterminedly directed surface wave field of fixed radial dimensions, to transmit a series of pulses of a predetermined repetition rate and on a predetermined carrier frequency over that line, and to measure the electrical spacing or time difference between the pulses transmitted along the line and pulses reflected from an object in the surface wave field, thereby establishing the distance between the point of transmission and the point of reflection.

Another object of the invention is to provide a surface wave transmission line extending substantially parallel to the ground at a distance of at least one full wave length of the lowest frequency of the operating frequency range of the transmission line, to send over this line at least one pulse series on at least one frequency carrier within that operating frequency range and to measure the spacing between the pulses transmitted toward and pulses reflected from any object in that field.

A further object of the invention is to provide at least one surface wave transmission line parallel to the ground at a height corresponding to several field radii at the highest operative wavelength, to transmit a number of pulses over that line on a carrier frequency corresponding to at least one of these field radii, and to measure the spacing between pulses transmitted over the line and pulses reflected from any objects in the field of the line and received at the point of transmission.

Still another object of the invention is to transmit on several different carrier frequencies simultaneously or alternatively several pulse sequences of the same or of different repetition rates over at least one surface wave transmission line extending substantially parallel to the ground at a height at least of the order of wavelength of the largest wave transmitted over the line, and to measure substantially separately for the different carrier frequencies, the distances between pulses transmitted over the line and pulses reflected from any object in the field of that line and received at the point of transmission so as to determine the passing of an object at different distances from the line, corresponding to different radial field dimensions as determined by the different carrier frequencies.

Still further an object of the invention is to provide several surface wave transmission lines extending substantially parallel to each other at such distances as substantially not to interfere one with another, to transmit over each of these transmission lines in the same or in opposite directions at least one pulse sequence of predetermined repetition rate and to measure the distance between pulses transmitted over and pulses reflected from each line from a common observation station so as to determine the distance of an object in the different fields of these lines as well as the speed of its movement.

As a specific object of the invention, the different parallel surface wave transmission lines are operated in parallel circuits and all or some of them connected to operate at the same or at different carrier frequencies so as to permit separate evaluation of any objects in the fields of the different lines.

As another specific object of the invention, the several surface wave transmission lines are operated all or some of them in series connected circuits so as to permit the transmission on all or some of the lines of the same carrier frequency or frequencies, while still being able by observing the spacing between transmitted and reflected pulses to identify the position of an object in the field of any one of these lines.

As a still further specific embodiment of the invention a number of parallel lines are arranged parallel to each other and either connected in parallel or in series so as to cover a predetermined area not only in one direction along the lines but also in a direction perpendicular thereto to permit identification of the position of any object in said area by measuring the distance between pulses transmitted over any one of the lines and pulses reflected therefrom.

It is also an object of the invention to combine a physical fence with a "security" fence produced by the field of a surface wave transmission line by arranging above a physical fence and in the plane of that physical fence a surface wave transmission line at such height that an object passing through the space between line and fence causes a field disturbance and a reflection of at least one pulse sequence transmitted over the line, thereby determining the distance of the object from the point of transmission.

Another object of the invention is to extend the range of the surface wave field by providing in the surface wave transmission line a number of amplifier stations provided with directional couplers, spaced, for example at 4 miles each, and adapted to amplify separately transmitted and reflected pulses, and having sufficient band width and predetermined delay characteristics to permit pulses transmitted to be amplified, and after reflection to be amplified, without substantially affecting the relative spacing between the pulses for evaluation of the distance between the point of transmission and that of reflection.

It is still another object of the invention to provide a number of carrier frequencies for a corresponding number of pulse sequences which are substantially simultaneously transmitted from a common observer station over at least one surface wave transmission line containing a series of intermediate bidirectional amplifier stations; these stations having at least in the outward direction a band width regularly decreasing from a band width embracing all the carrier frequencies to one embracing only one carrier frequency; the same amplifier stations having in the return direction either a broad band width embracing all the carrier frequencies, or a bandwidth regularly increasing from a band width embracing only one carrier frequency to one embracing all carrier frequencies, so as to permit the amplifier sector in which pulse reflection takes place to be identified from the number of carrier frequencies showing equal pulse spacings between transmitted and reflected pulses.

As another object of the invention, a number of carrier frequencies are applied to a surface wave transmission line as specified before simultaneously in one direction and another number of carrier frequencies in the other direction, bidirectional amplifier stations of a band width being provided stepwise varying by at least one frequency step from one station to the next station in the outgoing direction, so as to permit from opposite directions, independently from each other, identifications of an object in the field of the line and at the same time identification of the amplifier sector between stations in which the object appears.

These and other objects of the invention will be more fully apparent from the drawings annexed hereto in which:

FIG. 1 shows an extended object detecting system by surface waves including intermediate amplifiers.

FIG. 2 shows a detection system involving the use of different carrier frequencies over the same line.

FIG. 3 shows the cascading of several surface wave transmission lines of an object detection system; and FIG. 4 the parallel operation of a number of surface wave transmission line.

FIG. 5 illustrates the combination of a physical fence with a nonphysical security fence constituted by a surface wave transmisison line.

FIG. 6 shows the simultaneous application of a number of carrier frequencies for object detection in a long line including use of intermediate amplifier stations for better or additional identification of the station sector from which the reflected signal originates.

FIG. 7 shows the application in opposite direction of several pulse series on different carrier frequencies for object detection from both directions, and also the identification of predetermined line sections by the use of amplifier stations of predetermined frequency ranges.

As apparent from FIG. 1 a surface wave transmission line consisting of a launching horn 2 adapted to produce a surface wave of appropriate shape and diameter on an insulated wire or cable designed to maintain such surface wave, is mounted on polyester poles 3 in such a way and at such height as to produce and maintain a surface wave field of such intensity that pulse signals transmitted over the line will be reflected by an object in the field, for example a human body passing thereunder, with sufficient amplitude to be noticeable or measurable in terms of phase displacement or time distance between the transmitted pulse signal and that reflected from the object.

Such a surface wave field, preferably of a field radius of one wavelength of the operating frequency range, can be equipped to measure such phase displacement by impulse reflectometer equipment, known per se for example, under the name Zupi, manufactured by the firm of Rhode & Schwartz.

Such an inpulse reflectometer equipment consists essentially of a transceiver station schematically indicated in FIG. 1 at 4 and comprising a VHF or UHF pulse transmitter 5, directive couplers 6 and 7 for sampling the incident and reflected signals, respectively, and a receiver including a cathode ray tube with screen for displaying the phase difference of incident and reflected pulses which correspond to the distance between the pulse reflecting object in the surface wave field and the pulse transmitter. More specifically the equipment may be adapted to produce VHF pulses of .1 microsecond duration and 50 kHz. repetition frequency which are transmitted over the surface wave transmission line to be supervised, and to receive the pulses reflected from the disturbances of the surface wave field. Transmitted and reflected pulses are applied to an oscillograph of sufficient band width. The amplitude range to be measured extends from .6 to 100% of the transmission pulses. The position of the reflections are determined on the oscillograph. In a specific example distance of measuring was found to extend from 50–2000 meter and the resolving power of the equipment to be of the order of 15 meters of the electrical length involved, at the frequency under consideration, with frequency ranges extending from 47–68 mc., 81–102 mc. and 174–223 mc.

For the elimination of disturbing transmitters, band filters are expected to eliminate low pass harmonics, while, in order to extend the lower end of the distance range to be evaluated, delay lines lines are inserted into the line.

In accordance with the invention, to permit extension of the distance to be covered by pulse reflection, intermediate bidirectional amplifier stations are inserted in the path of the surface wave transmission line, as schematically indicated at 9, 9′, each provided with a pair of amplifiers schematically indicated at 10, 11 and two pairs of directional couplers 12, 13 and 14, 15, designed to direct the different phase displaced pulses to and from amplifiers 10, 11, from and to their line termination horns, 16 and 17 respectively, thereby extending the reach of detection by impulse reflection, and permitting discovery of any field disturbance or object over a long distance.

Preferably bidirectional amplifier stations of the type indicated at 9 and 9′ are provided with a predetermined fixed time delay, which, if necessary could be the same for all amplifier stations, so as to permit taking exactly into account the delays caused by the amplifier stations, when the distance of a field disturbance or occurrence such as passage of an object, or damage or break of the line, is evaluated.

FIG. 2 illustrates the use of different impulse producing carrier frequencies, or frequency ranges, and the successive or simultaneous generation of a number of surface wave fields of different wavelengths or different reflectometrically effective field radii, as schematically indicated at $\lambda_1$, $\lambda_2$, $\lambda_3$. These surface wave fields are produced by impulse reflectometer transceivers 18, 19, 20, operating at different frequency ranges over band pass filters schematically indicated at 21, 22, 23 and coupled to the same surface wave transmission line which is illustrated by launching horn 24, and a cable 25.

Here, too, if necessary, bidirectional amplifier stations of the broad band type may be inserted in the line to extend the distance of the system and the effective evaluation of impulse reflection over such distance.

The various reflectometrically effective field radii $\lambda_1$, $\lambda_2$, $\lambda_3$ do not only permit an evaluation of the distance along the line and between the transceiver and an object, or any other disturbance of the field, but they also permit an evaluation of the radial distance of the object from the line.

Transceiver 20, for example, would then indicate a radial distance corresponding to wavelength $\lambda_3$, transceiver 19 a shorter distance corresponding to wavelength $\lambda_2$ and transceiver 18 a still closer approach corresponding to distance $\lambda_1$.

Any amount of different frequencies or frequency ranges may be produced and transmitted in this method, resulting in an increasing accuracy of evaluation of radial distance of the field disturbing object from the line. All this can be achieved without departing from the scope of this invention.

FIG. 3 represents another method of distance determination or evaluation, which is effective not only in the direction along or parallel to the surface wave transmission line but also in a direction perpendicularly thereof.

In this modification, two or more surface wave transmission lines are arranged more or less substantially in parallel, or in any other way as may be dictated by the topography of the land involved, as exemplified by two surface transmission lines 26, 27 located at a distance of, say 500 ft., indicated at 28 and which are interconnected by another transmission line schematically indicated at 29 such as a coaxial cable or another surface wave transmission line schematically indicated by launching and receiving horns 30, 31, which are connected to the horns of surface wave transmission lines 26, 27, respectively.

If necessary, intermediate transmission line 29 may contain a bidirectional amplifier station 22 of the type indicated in FIG. 1 at 9, 9' or any other type.

An impulse reflectometer transceiver is shown arranged at 33 permitting, depending on the distance between reflected and transmitted pulses, to determine whether a disturbance has passed line field 27 or line field 28 or conversely, thereby permitting an evaluation of the direction of travel of the disturbance, not only as the case may be, along one of the lines, but also in a direction perpendicular to the lines.

By multiplying this parallel array of surface wave transmission lines, an area of any desired size or shape can be covered for surveillance.

As illustrated in FIG. 4 each of a number of parallel surface wave transmission lines, or at least a number of them, can be provided with separate impulse reflectometer transceivers such as indicated at 34, 35, 36, feeding a corresponding number of surface wave transmission lines 37, 38, 39, with the same or different impulse carrier frequencies or frequency ranges, and permitting a far reaching and accurate surveillance of relatively large and complex areas.

Any combination of systems such as shown in FIGS. 1–4 is feasible in accordance with the invention and appropriate, depending upon conditions given and characteristics desired for the surveillance, all this without departing from the scope of this disclosure.

FIG. 5 shows the combination of a physical security fence made, for example, of galvanized steel, with a security fence formed by a surface wave field in accordance with the invention.

The surface wave field produced by a surface wave transmission line 40 is formed as a part of the physical fence which is schematically indicated at 41. The physical fence 41 in turn determines at least part of the configuration of the surface wave field. In this case the distance between surface wave transmission line 40 and physical fence 41 may be considerably less than one wave length. In this way not only a person slipping over fence 41 and between line 40 and fence 41 will produce a noticeable pulse reflection on the impulse reflectometer transceiver 42 connected to the line but it will also serve to indicate a person approaching or penetrating the physical fence 41.

As previously stated, with impulse reflectometer 42 being connected to line 40, metal fence 41, may serve as a ground or as a field determining element. Line 40 is otherwise supported on fiberglas stubs or rods 43 attached to fence 41.

At the termination of the surveillance zone formed by the surface wave transmission line 40, line 40 itself may not be terminated exactly, but gradually guided to approach ground over a distance of several wave lengths, and then connected and attached to fence 41 as schematically indicated in FIG. 5 at 44, thereby reducing undesired reflections in the system to a minimum.

FIG. 6 illustrates another method of extending the physical length of surveillance or security zone in accordance with the invention.

This method is explained by way of assuming an acceptable accuracy of pulse reflection evaluation of the order of 2 kilometers, i.e., the impulse reflectometer under consideration will only work effectively over a distance of 2 km. to produce noticeable signals indicating the distance between the reflecting object and the transceiver.

The invention permits with the same equipment to extend the zone to many times that distance, for example, as explained by way of FIG. 6, to a distance of 20 km. This is achieved by dividing the entire zone of 20 km. in 10 sectors of 2 km. length.

In order to realize such a system, 10 impulse reflectometer transceivers represented by cathode ray tube screens 45, 46, . . . 54 and operating at different frequencies, or frequency ranges, represented by filters 55, 56 . . . 64, are applied to a surface wave transmission line schematically indicated at 65 which serves to define the surveillance zone under consideration.

The different sectors of line 65, each as stated above being assumed to be of minimum acceptable sensitivity range such as 2 km. length, are interconnected by bidirectional amplifier stations such as indicated at 66, 67 . . . 75 respectively.

However, the two amplifiers in each amplifier station are designed to have, or are connected to filters having, different band width characteristics.

Thus amplifier 66', operative in direction N, has a bandwidth covering all frequencies or frequancy ranges from $F_1$ to $F_9$. The corresponding amplifier in the next amplifier station 67 will have a band width from $F_1$ to $F_8$, and so on, until the last corresponding amplifier in station 75 will only have a bandwidth $F_1$. All the amplifiers operative in the opposite direction as indicated by N, such as 66'' in station 66, etc., have substantially the same bandwidth extending from $F_1$ to $F_{10}$.

Thus a reflecting signal appearing simultaneously on all 10 screens 45–54 will indicate a field disturbance taking place in surveillance sector I. The reflecting signal simultaneously appearing on screen 45–53 will indicate a disturbance in sector II and so on, until finally a reflecting signal appearing only on screen 10 will signify a disturbance in sector X.

FIG. 7 extends still further the application of this method of large distance surveillance, with a resulting increase of efficacy and accuracy of control and observation.

In this application a number of different impulse carrier frequencies, or frequency ranges, are applied to both ends of a surface wave transmission line 76 which forms a surveillance zone consisting again of a great number of sectors examplified for example by ten sectors, designated as before by I, II . . . X, respectively.

The different impulse reflectometers connected to the line, at one end of surface wave transmission line 76 are represented by cathode ray tubes 77, 78, . . . 86, controlled by filters 87, 88 . . . 96 of bandwidth $F_1$, $F_2$ . . . $F_{10}$, respectively. The other end of surface wave transmission line 76 is fed by impulse reflectometers represented by cathode ray tubes 97, 98 . . . 106, respectively, and controlled by filter 107, 108 . . . 116 of bandwidth $F_{11}$, $F_{12}$ . . . $F_{20}$, respectively.

Each amplifier station connecting the adjoining sectors of surface wave transmission line 76 comprises two pairs of bidirectional substations; thus amplifier station 117 comprises a bidirectional substation 117' with an amplifier in the N direction having a bandwidth extending from $F_1$ to $F_9$ and an amplifier in the S direction having a bandwidth from $F_1$ to $F_{10}$. The last corresponding amplifier substation 126' in a similar progression as indicated with respect to FIG. 6, will have a bandwidth in the N direction of $F_1$ and in the S direction of $F_1$–$F_{10}$.

This permits sectorial identification or identification of a signal with a particular sector, on cathode ray tubes 77 to 86 in a manner similar to that indicated in FIG. 6.

At the same time similar identification and checking becomes feasible in the opposite direction on cathode ray screens 97 to 106 by providing additional amplifier substations 117'' to 126'' respectively, assuring in the S direction a bandwidth decreasing from $F_{11}$–$F_{19}$, to $F_{11}$ and remaining constant in the S direction at $F_{11}$–$F_{20}$.

While the invention has been described and illustrated by certain pulse generating, discriminating and receiving methods, and by specific measuring, reflecting and observation systems, by the arrangement and connection, physical and electrical, of certain transmission lines, the invention is not limited thereto, but may be applied in any

I claim:

1. In combination, a single surface wave transmission line, means for launching on said line surface waves of a field diameter of the order of one wavelength of the upper end of the operating frequency range of said line, means for supporting said line at a distance above ground of the order of said wavelength to determine a substantially unimpeded surface wave propagation path between said line and ground, means for transmitting through said launcher means at least pulses of a frequency within said range, means at the point of transmission for indicating the position in time of said pulses, and means at the point of transmission for receiving and indicating the position in time of pulses reflected over said line from any object in said path of surface wave propagation so as to determine the difference in travel time between transmitted and reflected pulses and thereby the distance of said object from the point of transmission.

2. System according to claim 1, wherein said surface wave transmission line is arranged at a distance of several field radii of the surface wave at maximum wavelength.

3. System according to claim 1, wherein a number of pulse carrying frequencies are transmitted simultaneously to determine the position of objects at different distances from said surface wave transmission line.

4. System according to claim 1, wherein a number of pulse carrying frequencies are transmitted simultaneously to determine the position of objects at different heights.

5. In combination, an electromagnetic wave transmission line and means for supporting said line above ground to determine a substantially unimpeded wave propagation path between line and ground, means for transmitting simultaneously over a number of successive sections of said transmission line a number of different pulse-carrying frequencies, bidirectional amplifier stations arranged between said successive sections, each amplifier station at least in the outward direction being adapted to pass only predetermined frequencies, means at the point of transmission for indicating the position in time of said pulses, and means at the point of transmission for receiving and indicating the position in time of pulses reflected over the line from any object in said path of wave propagation, so as to determine the difference in travel time between transmitted and reflected pulses and thereby the distance of said object from the point of transmission; said amplifier stations being adapted to pass all frequencies in the opposite direction, so as to permit the location of the reflection in one of said predetermined sections.

6. System according to claim 5, wherein each amplifier section has a predetermined delay characteristic in one direction and the same in the other direction.

7. System according to claim 5 wherein each amplifier section has a predetermined delay characteristic in one direction and a different one in the other direction.

8. System according to claim 1, comprising several surface wave transmission lines arranged in parallel and horizontally side by side, but transmitting in opposite directions.

9. System according to claim 8, wherein said surface wave transmission lines are connected in series.

10. System according to claim 1, comprising several bidirectional amplifier stations arranged in said surface wave transmission line of predetermined delay characteristics.

11. In combination, a surface wave transmission line and means for supporting said line at a distance above ground of at least one wavelength of the upper end of the operating frequency range, means for transmitting at least pulses of a frequency within said range over said transmission line; means for indicating the position in time of said pulses and means for indicating pulses reflected over the line from any object causing said reflection, so as to determine the difference in travel time between transmitted and reflected pulses; a number of different pulse carrying frequencies being transmitted, simultaneously, over a number of successive sections of the line, bidirectional amplifier stations being arranged between the successive sections, each amplifier station at least in the outward direction being adapted to pass only predetermined frequencies; and the last amplifier section being adapted to pass all frequencies, the succeeding amplifier section to pass all but one frequency, and so on, thereby assigning to each section a predetermined reflection characteristic permitting reflections to be assigned to the number of sections.

References Cited

UNITED STATES PATENTS

| | | | |
|---|---|---|---|
| 3,047,849 | 7/1962 | Hansen | 340—258 |
| 3,131,376 | 4/1964 | Du Vall. | |
| 3,230,518 | 1/1966 | Vassil et al. | 340—258 |
| 3,270,339 | 7/1967 | McEuen et al. | |
| 3,331,065 | 7/1967 | McDonald. | |

RODNEY D. BENNETT, *Primary Examiner.*

J. P. MORRIS, *Assistant Examiner.*

U.S. Cl. X.R.

340—258